(12) United States Patent
Fukumoto et al.

(10) Patent No.: US 7,075,863 B2
(45) Date of Patent: Jul. 11, 2006

(54) METHOD OF DETERMINING OPTIMUM TRACKING OFFSET VALUE DURING OPTIMUM POWER CONTROL (OPC) FOR OPTICAL DISK DRIVE

(75) Inventors: Makoto Fukumoto, Hamura (JP); Akira Shinohara, Hannou (JP); Toshihiro Ogawa, Iruma (JP)

(73) Assignee: TEAC Corporation (JP)

( * ) Notice: Subject to any disclaimer, the term of this patent is extended or adjusted under 35 U.S.C. 154(b) by 524 days.

(21) Appl. No.: 10/083,759

(22) Filed: Feb. 26, 2002

(65) Prior Publication Data

US 2002/0122362 A1   Sep. 5, 2002

(30) Foreign Application Priority Data

Feb. 26, 2001   (JP)   ............................. 2001-050653

(51) Int. Cl.
*G11B 7/095*   (2006.01)

(52) U.S. Cl. ............................. 369/44.29; 369/47.51

(58) Field of Classification Search ............ 369/44.28, 369/44.29, 44.41, 47.51, 47.53, 44.51, 44.5, 369/44.31; G11B 7/095
See application file for complete search history.

(56) References Cited

U.S. PATENT DOCUMENTS

| | | | | |
|---|---|---|---|---|
| 5,305,296 A * | 4/1994 | Kono | ......................... | 369/116 |
| 5,671,209 A * | 9/1997 | Kamioka et al. | ........... | 369/116 |
| 6,292,448 B1 * | 9/2001 | Yoshida et al. | .......... | 369/53.27 |
| 6,301,212 B1 * | 10/2001 | Kubo et al. | ................. | 369/53.2 |
| 6,434,106 B1 * | 8/2002 | Ohtsuka | .................... | 369/116 |
| 6,438,077 B1 * | 8/2002 | Mashimo | ................. | 369/44.28 |
| 6,535,470 B1 * | 3/2003 | Wu | ........................... | 369/53.3 |
| 6,557,126 B1 * | 4/2003 | Kelly | ........................ | 714/708 |
| 6,741,533 B1 * | 5/2004 | Hiratsuka et al. | ......... | 369/44.41 |
| 6,859,426 B1 * | 2/2005 | Ogawa et al. | ........... | 369/47.53 |

FOREIGN PATENT DOCUMENTS

| | | |
|---|---|---|
| JP | 03-142721 | 6/1991 |
| JP | 5-144044 | * 6/1993 |
| JP | 10-308023 | 11/1998 |
| JP | 3057875 | 3/1999 |
| JP | 2000-244054 | * 9/2000 |
| JP | 2000-285485 | 10/2000 |
| JP | 2000-298862 | 10/2000 |

OTHER PUBLICATIONS

MAT of JP 2000-285485.*

* cited by examiner

*Primary Examiner*—A M Psitos
(74) *Attorney, Agent, or Firm*—Anderson Kill & Olick, PC

(57) ABSTRACT

A method of an optical disk drive for determining both an optimum write power and an optimum tracking offset value using a test area reserved for a conventional OPC operation by determining a coarsely adjusted laser power using a portion of the test area, determining an optimum tracking offset using another portion of the test area, and determining an optimum write power using the remaining portion of the test area. The optimum tracking offset ensures that the RF signal is not affected by a wobble formed on a groove.

6 Claims, 15 Drawing Sheets

FIG.5

CHARACTERISTIC VALUE TABLE

| DISK ID NUMBER | ROTATIVE MODE | TARGET CHARACTERISTIC VALUE |
|---|---|---|
| D1 | SINGLE SPEED | $\beta 0$ |
| | DOUBLE SPEED | $\beta 1$ |
| | 4 TIMES SPEED | $\beta 2$ |
| | 6 TIMES SPEED | $\beta 3$ |
| | 8 TIMES SPEED | $\beta 4$ |
| | 12 TIMES SPEED | $\beta 5$ |
| | 16 TIMES SPEED | $\beta 6$ |
| D2 | SINGLE SPEED | $\beta 7$ |
| | DOUBLE SPEED | $\beta 8$ |
| | 4 TIMES SPEED | $\beta 9$ |
| | 6 TIMES SPEED | $\beta 10$ |
| | 8 TIMES SPEED | $\beta 11$ |
| | 12 TIMES SPEED | $\beta 12$ |
| | 16 TIMES SPEED | $\beta 13$ |
| ⋮ | ⋮ | ⋮ |
| ⋮ | ⋮ | ⋮ |

FIG.6

WRITE POWER TABLE

| ROTATIVE MODE | INITIAL WRITE POWER | SETP |
|---|---|---|
| SINGLE SPEED | Pstt1 | Pstp1 |
| DOUBLE SPEED | Pstt2 | Pstp2 |
| 4 TIMES SPEED | Pstt4 | Pstp4 |
| 6 TIMES SPEED | Pstt6 | Pstp6 |
| 8 TIMES SPEED | Pstt8 | Pstp8 |
| 12 TIMES SPEED | Pstt12 | Pstp12 |
| 16 TIMES SPEED | Pstt16 | Pstp16 |

METHOD OF DETERMINING OPTIMUM TRACKING OFFSET VALUE DURING OPTIMUM POWER CONTROL (OPC) FOR OPTICAL DISK DRIVE

BACKGROUND OF THE INVENTION

1. Field of the Invention

The present invention generally relates to an optical disk drive, and more particularly, to an optical disk drive that determines write tracking offset automatically.

2. Description of the Related Art

Grooves and lands, the portion between two grooves adjacent to each other, are formed on a write-once type optical disk such as a compact disk-recordable (CD-R) or a digital versatile disk-recordable (DVD-R) in advance. An optical disk drive designates either the grooves or the lands as the tracks and forms pits indicating information by applying a laser beam on the track. The tracking servo unit of the optical disk drive controls the position in a radial direction of the optical axis of the laser beam to trace the center of the track.

The groove is slightly wobbled at a center frequency of 22.05 kHz in the radial direction and contains address information, that is, time information called an absolute time in pre-groove (ATIP) having a maximum divergence of +/−1 kHz multiplexed to the center frequency by FSK modulation that is used in a recording operation. Since the amplitude of the wobble signal is small, it does not affect the tracking servo. Because the frequency of the wobble signal is not in the tracking servo frequency range, the laser beam axis traces the center of the track on average.

The optical disk drive receives the laser beam reflected by the optical disk with a photo detector having a light detecting face divided into two portions in the radial direction of the optical disk, and detects the wobble signal by differentially amplifying the RF signals received by the two portion of the photo detector. The optical disk drive controls the spindle motor rotation based on the carrier frequency of the wobble signal, 22.05 kHz and rotates the optical disk at a predetermined rotative speed. The optical disk drive further demodulates the wobble signal to obtain the address information.

In a read operation, the optical disk drive controls the laser beam axis and traces the center of the track. The optical disk drive applies a laser beam on the pits formed on the track of the optical disk, and receives the laser beam reflected by the optical disk with the photo detector as described above. By adding two optoelectronic signals received by the corresponding portions of the photo detector, the optical disk drive eliminates the wobble signal and detects the read signal that has been recorded.

FIG. 13 is a schematic drawing showing the format of information recorded in a CD-R disk, a write once type optical disk. In the direction from an inner radius to an outer radius, a power calibration area (PCA) where the optimum write power is determined and an information area are provided. The information area consists of a program memory area (PMA) for the temporary storage of signal recording information, a lead-in area, a user's data area, and a lead-out area.

In order to determine the optimum write power of the laser beam, a CD-R drive performs an optimum power control (OPC) operation before it starts an actual write operation. In the OPC operation, the CD-R drive measures the recording properties of a CD-R disk by recording and reproducing test signals in the power calibration area located in a predetermined position of the CD-R disk. The power calibration area includes a test area for 100 test recordings, partitions P001–P100. Each partition consists of 15 frames F01–F15. The test signal is recorded in 15 frames at 15 different write powers that increases in 15 steps, each frame being recorded by a corresponding write power, and is reproduced. The optimum power is determined based on the peak value and the bottom value of the reproduced test signal. Among the 15 different write powers, the power that best fits the disk is determined as the optimum power. The OPC operation is necessary to compensate for the difference in the recording properties of disks manufactured by different manufacturers.

FIG. 14 depicts an AC coupled radio frequency (RF) signal reproduced from a CD-R disk. The envelopes, a peak value (P), and a bottom value (B) of the signal are also shown in FIG. 14. The AC coupled RF signal is the AC component signal resulting from filtering out a DC component from the reproduced read signal. In the OPC operation, the test signal is recorded in 15 frames in the test area at 15-stepped write power, each frame being recorded by a corresponding write power of a laser diode. Each frame is recorded by a write power corresponding to the frame. The write power is increased, frame by frame, in 15 steps from the minimum power to the maximum. The peak value and the bottom value of the RF signal are detected as shown in FIG. 14.

The peak value (P) is positive and the bottom value (B) is negative. A characteristic value $\beta$ is defined as $\beta=(P+B)/(P-B)$. If the absolute value of the peak value (P) is equal to the absolute value of the bottom value (B), the peak point and the bottom point are positioned at the same distance from the 0 V line but in the opposite direction, and $\beta=0$ (P+B=0). The characteristic value $\beta$ changes as the write power increases. If the characteristic value $\beta$ exceeds a predetermined value (0.04, for example), the write power is determined as the optimum write power. Then, write operations are performed at the optimum write power.

Because a read power and a write power differ, the laser beam axes corresponding to the read power and the write power are often slightly different from each other because the laser beam axis depends on a power level. FIG. 15 shows the difference in the optical axes between the read power and the write power. The laser beams corresponding to the read power and the write power are described with a solid line and a dotted line, respectively. The difference in the angle of the optical axes is indicated by "$\theta$". If the optical axis slides in the direction of a groove width, that is, the radial direction of the optical disk, pits that are formed with the write power are formed off the track center as shown in FIG. 16, since the tracking servo is performed with the read power laser beam.

In the case that the groove is designated as the track, because the groove is wobbled, the write power laser beam axis repeatedly moves to the groove edge and to the groove center at a frequency of the wobble. When the laser beam comes to the groove center, pits are formed in a normal manner, but if the laser beam traces far from the groove center, pits are formed insufficiently since the groove edge affects the pits. Accordingly, the read signal is affected at the wobble frequency.

Because the tracking error signal is generated based on the pits and the grooves in a read operation, the laser beam passes through substantially on the center of the pits. However, the reproduced RF signal is modulated and/or distorted at the wobble frequency due to the sliding of the pits during a write operation. The effect of the sliding of the pits during the write operation becomes greater as the frequency of the write signal increases. As to the CD-R, the write signal having a cycle time of 3×T (T=230 nsec, that is, a cycle time of the frequency 4.32 MHz corresponding to a single speed) is most affected. FIG. 17 is waveform of a reproduced RF signal.

If the envelopes of the reproduced RF signal are modulated by the wobble signal component, the modulation causes jitter (chattering noise) when the reproduced RF signal is converted into a binary signal. The binary signal outputted by the comparator contains the wobble signal component.

SUMMARY OF THE INVENTION

Accordingly, it is a general object of the present invention to provide a novel and useful method of controlling tracking offset for an optical disk drive in which the problem described above is eliminated.

Another and more specific object of the present invention is to provide a method of determining the optimum tracking offset value during an optimum power control (OPC) operation.

To achieve one of the objects above, a method of determining an optimum tracking offset value for an optical disk drive, includes a step of determining a tracking offset value set of a plurality of tracking offset values, a step of recording a first test signal in a first frame set of a plurality of frames using a write power and the tracking offset value set, each frame being recorded by a corresponding tracking offset value, a step of reproducing the first test signal recorded in the first frame set, a step of calculating first measured characteristic values corresponding to each tracking offset value included in the tracking offset value set, a step of obtaining tracking offset characteristics by interpolating the first measured characteristic values, and a step of determining an optimum tracking offset value that gives a maximum value in the tracking offset characteristics.

The first test signal is recorded and reproduced in the frames in the first frame set, each frame being recorded by a corresponding tracking offset value, and the tracking offset characteristics are measured. The tracking offset value that exhibits the best performance is determined as the optimum tracking offset value.

The present invention is further characterized in that the first frame set comprises a plurality of frame groups, each including a plurality of frames, the steps of recording the first test signal, reproducing the first test signal, and calculating first measured characteristic values are repeated for each of the frame groups, the first measured characteristic values obtained for each of the frame groups are averaged for each tracking offset value, and the tracking offset characteristics are obtained using the average measured characteristic values.

The dispersion in characteristic values caused by the eccentricity and distortion of the optical disk is reduced by averaging the first measured characteristic values obtained for each of the frame groups.

The present invention is yet further characterized in that the frames included in the frame groups are located at different angular position in the optical disk, and the frames corresponding to each tracking offset value in different frame groups are located at different angular position in the optical disk.

The dispersion in characteristic values caused by the eccentricity and distortion of the optical disk is further reduced by averaging the first measured characteristic values obtained for each of the frame groups because the frames corresponding to each tracking offset value in different frame groups are located at different angular position in the optical disk.

Other objects and further features of the present invention will become apparent from the following detailed description when read in conjunction with the accompanying drawings.

BRIEF DESCRIPTION OF THE DRAWINGS

FIG. 5 is the table of target characteristic values β that is referred to in step S16 shown in FIG. 4;

FIG. 6 is a table of write power that is referred to in step S18 shown in FIG. 4;

DETAILED DESCRIPTION OF THE PREFERRED EMBODIMENTS

Figure 1:
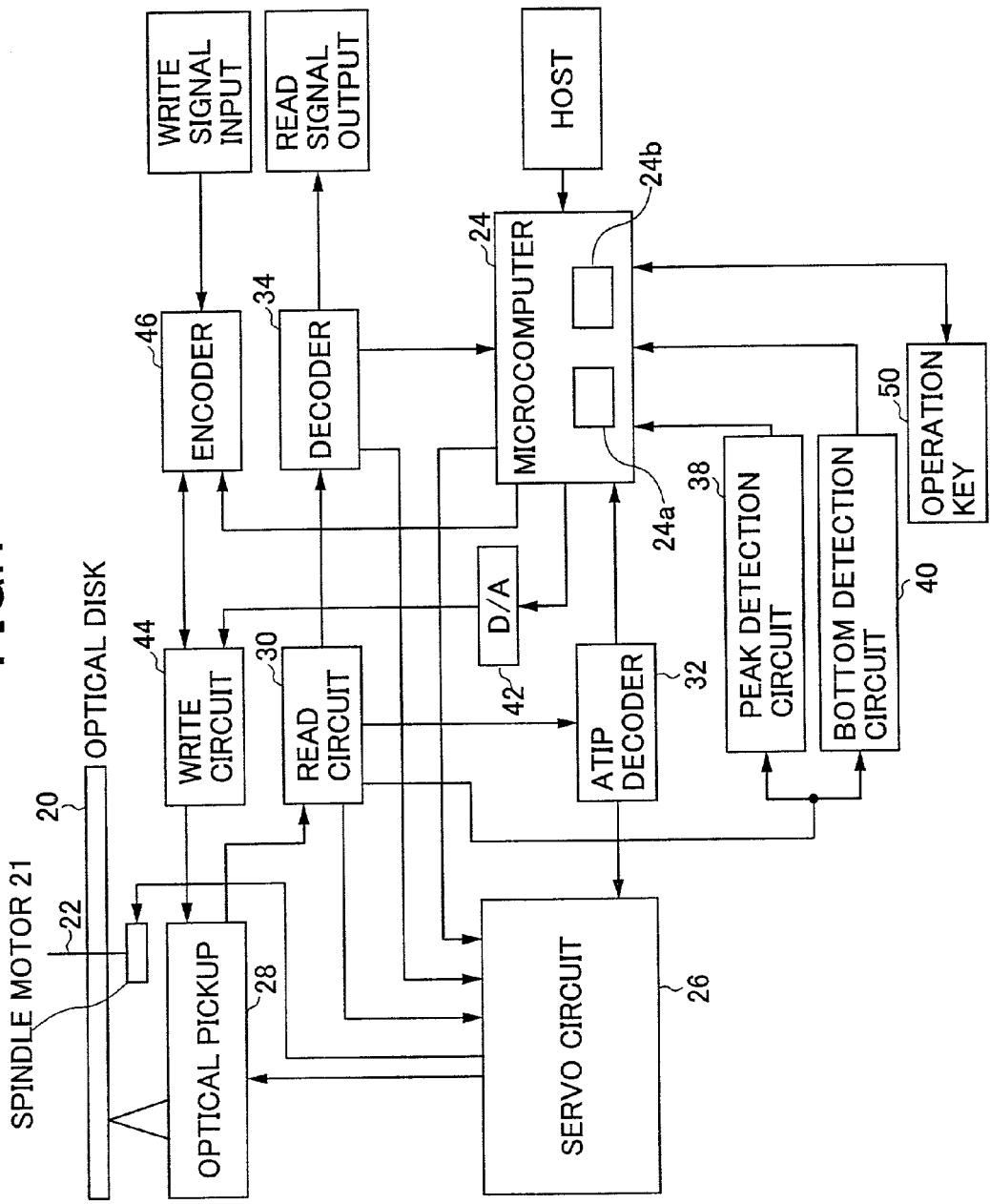
FIG. 1 is a block diagram showing an optical disk drive according to an embodiment of the present invention.

FIG. 1 is a block diagram of an optical disk drive according to an embodiment of the present invention. An optical disk 20 rotates as a shaft 22 is driven by a spindle motor 21. A microcomputer 24 controls a servo circuit 26 based on the read and write instructions provided by a host.

The servo circuit 26 controls the rotative speed of the spindle motor 21 in a constant linear velocity (CLV) servo, and controls a sled motor that actuates an optical pickup 28 to a desired block of the optical disk 20. The servo circuit 26 further performs as the focus servo and the tracking servo of the optical pickup 28.

The laser beam emitted by the optical pickup 28 is reflected by the optical disk 20, and detected by the optical pickup 28. The laser beam is converted into an RF signal by the optical pickup 28 and provided to a read circuit 30. The RF signal amplified by the read circuit 30 is provided to the servo circuit 26. An ATIP signal, on the other hand, is separated from the RF signal by the read circuit 30 by demodulating the RF signal modulated in an Eight to Fourteen Modulation (EFM) and provided to an ATIP decoder 32. The RF signal is further provided, after synchronization, to a decoder 34 for decoding based on a Cross Interleave Reed-Solomon Code (CIRC) and outputted as read data after error correction. The ATIP decoder 32 provides the microcomputer 24 and the servo circuit 26 with ATIP information such as an ID number and various parameters by decoding the ATIP signal.

The RF signal outputted by the read circuit 30 is provided to a peak detection circuit 38 and a bottom detection circuit 40. The peak detection circuit 38 detects peak values P of the RF signal, the peak value P being provided to the microcomputer 24. The bottom detection circuit 40 detects bottom values B of the RF signal, and the bottom value B is provided to the microcomputer 24.

The microcomputer 24 calculates the optimum write power and the optimum tracking offset value by performing the OPC operation and stores the results of the calculation in an embedded RAM 24a. The microcomputer 24 generates a write power control signal and an optimum tracking offset control signal based on the optimum write power and the optimum tracking offset value, etc. The write power control signal, after being converted by a D/A converter 42, is provided to a write circuit 44 and controls the write power. The optimum tracking offset control signal is provided as an offset to a tracking error detection circuit included in the servo circuit 26 and superimposed on a tracking control signal.

The encoder 46 encodes the input signal in a Cross Interleave Reed-Solomon Code (CIRC) under the control of the microcomputer 24 and provides the encoded input signal to the write circuit 44.

The write circuit 44 modulates the encoded input signal provided by the encoder 46 by an Eight to Fourteen Modulation (EFM), and amplifies the encoded input signal up to the voltage level corresponding to the write power designated by the write power control signal. The encoded input signal is provided, after being amplified, to the laser diode LD (not shown) included in the optical pickup 28. The laser diode LD emits a laser beam to the optical disk 20 to record the signal.

The RAM 24a embedded in the microcomputer 24 stores therein the previous data of the OPC operation, that is, the optimum write powers and corresponding optimum tracking offset values measured in the past. The previous data of the OPC operation is maintained for a predetermined time period.

Further, a ROM 24b embedded in the microcomputer 24 stores therein tables such as a characteristic value table showing target characteristic values corresponding to a disk type (the ID number of a disk) and a rotative mode (single, double, 4 times, 6 times, 8 times, 12 times, and 16 times speed, etc.), a write power table of the OPC showing an initial write power and a step corresponding to a rotative mode, and a tracking offset value table showing an initial tracking offset value and a step value. Operational inputs are transferred from an operation key 50 to the microcomputer 24.

Figure 2:
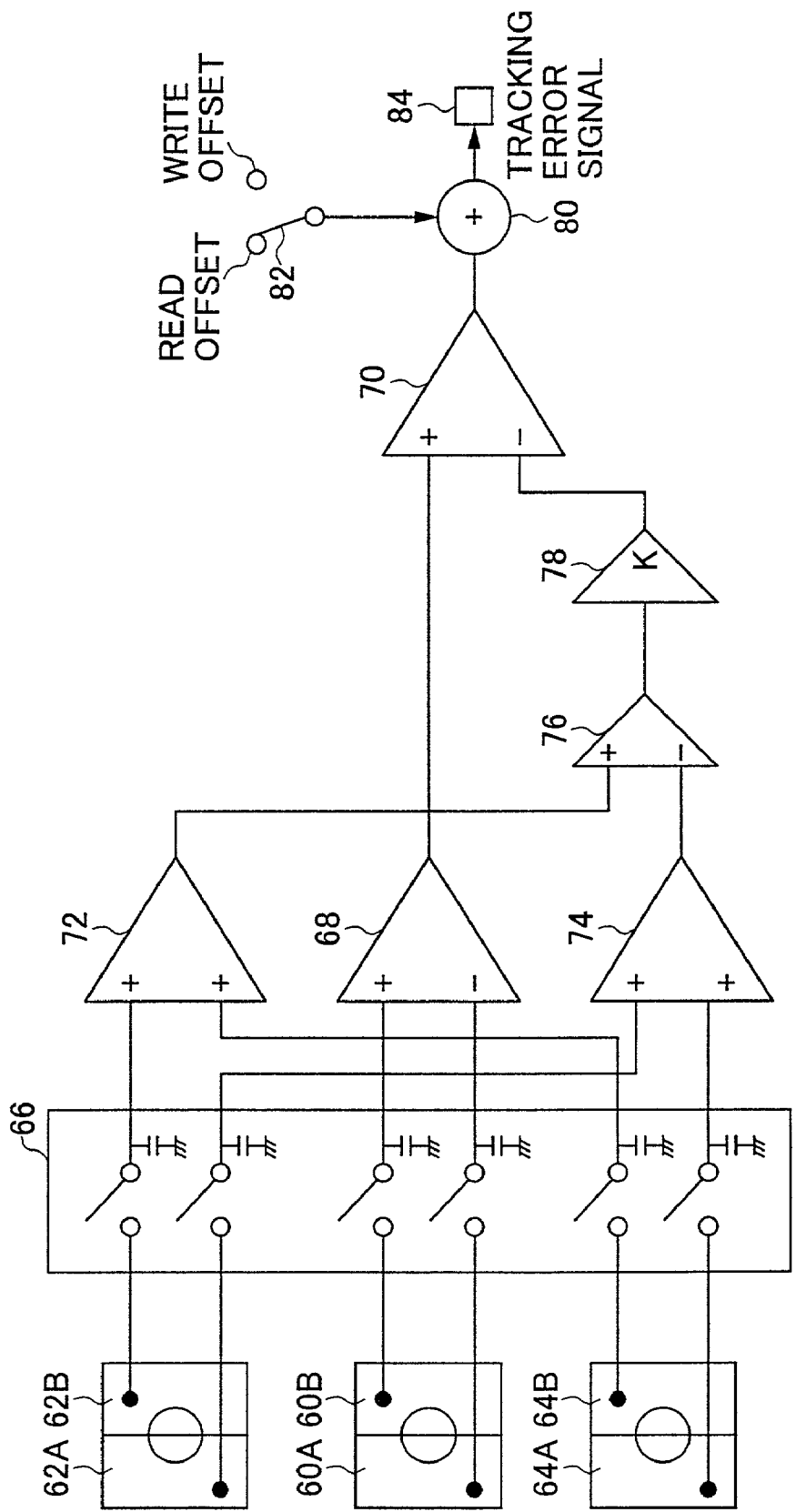
FIG. 2 is a circuit diagram showing a tracking error detection circuit using a differential push-pull method of the optical disk drive according to the embodiment.

FIG. 2 is a circuit diagram of a tracking error detection circuit, included in the servo circuit 26, using a differential push-pull method according to an embodiment of the present invention. In the case of the differential push-pull method, besides a main laser beam spot, a front sub-laser beam spot and a rear sub-laser beam spot are applied off the main laser beam spot along the center line of a groove at a predetermined distance in the opposite direction of the groove width. The reflected main laser beam is detected by a photo detector included in the optical pickup 28 divided into two portions 60A and 60B in the groove width direction. The reflected front sub-laser beam is detected by an optical detector divided into two portions 62A and 62B in the groove width direction, included in the optical pickup 28. The reflected rear sub-laser beam is detected by an optical detector divided into two portions 64A and 64B in the groove width direction, included in the optical pickup 28.

Each signal detected by the optical detectors 60A and 60B is provided, through a sample hold circuit 66, to a non-inverted input terminal and an inverted input terminal of a subtraction circuit 68, respectively. The differential signal outputted by the subtraction circuit 68 is provided to a non-inverted input terminal of a subtraction circuit 70. The sample hold circuit 66 samples RF signals detected by the respective photo detectors 60A, 60B, 62A, 62B, 64A, and 64B when the laser beam is at a read power, and holds the RF signals detected during the read operation while the laser beam is at a write power.

Each signal detected by the optical detector 62A and 62B is provided, through the sample hold circuit 66, to one of input terminals of adders 74 and 72, respectively. Each signal detected by the optical detector 64A and 64B is provided, through the sample hold circuit 66, to another input terminal of adders 74 and 72, respectively. The adder 72 adds the two input signals and provides its output to a non-inverted input terminal of a subtraction circuit 76, and the adder 74 adds the two input signals and provides its output to an inverted input terminal of the subtraction circuit 76. In order to generate the tracking error signal with a differential push-pull method, the differential signal outputted by the subtraction circuit 76 is amplified by an amplifier 78 at a gain of 7, for example, and provided to the non-inverted input terminal of the subtraction circuit 70.

The error signal outputted by the subtraction circuit 70 is provided to an adder 80 for adding a read offset or a write offset selected by a switch 82, and outputted to a terminal 84 as a tracking error signal. The tracking servo mechanism keeps the main laser beam on the track by maintaining the tracking error signal at zero.

Figure 3:
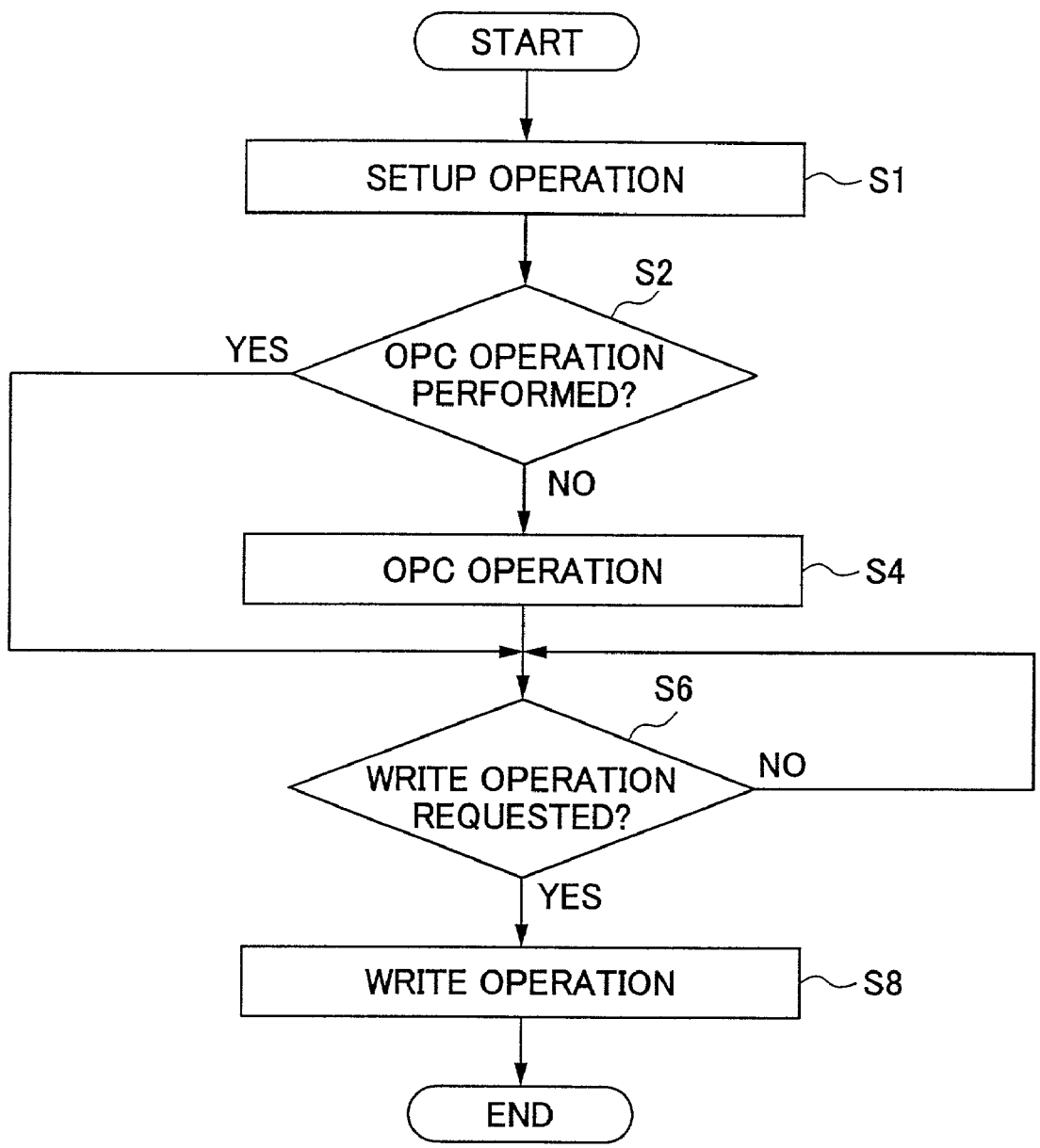
FIG. 3 is a flow diagram of a write operation that is performed by a microcomputer 24 shown in FIG. 1 of the optical disk drive according to the embodiment.

FIG. 3 is a flow diagram of a write operation performed by the microcomputer 24 according to the embodiment of the present invention. The microcomputer 24 sets up the optical disk drive by providing, for example, the servo circuit 26 with instructions to move the optical pickup 28 to a designated frame of the optical disk 20 by controlling the sled motor rotation included in the optical pickup 28 (Step S1). The microcomputer 24 checks whether the OPC operation has been performed previously (Decision S2), and continues the write operation if the OPC operation has been performed (YES branch of S2).

If the OPC operation has not been performed previously, the OPC operation will be done to determine the optimum write power and the optimum write tracking offset (S4). After the optimum write power and the optimum write tracking offset are determined by the OPC operation, the microcomputer 24 further checks whether a write operation is requested (S6). If a write operation is requested, the information of the optimum write power and the optimum write tracking offset is retrieved and the write operation is performed (S8).

Figure 4:
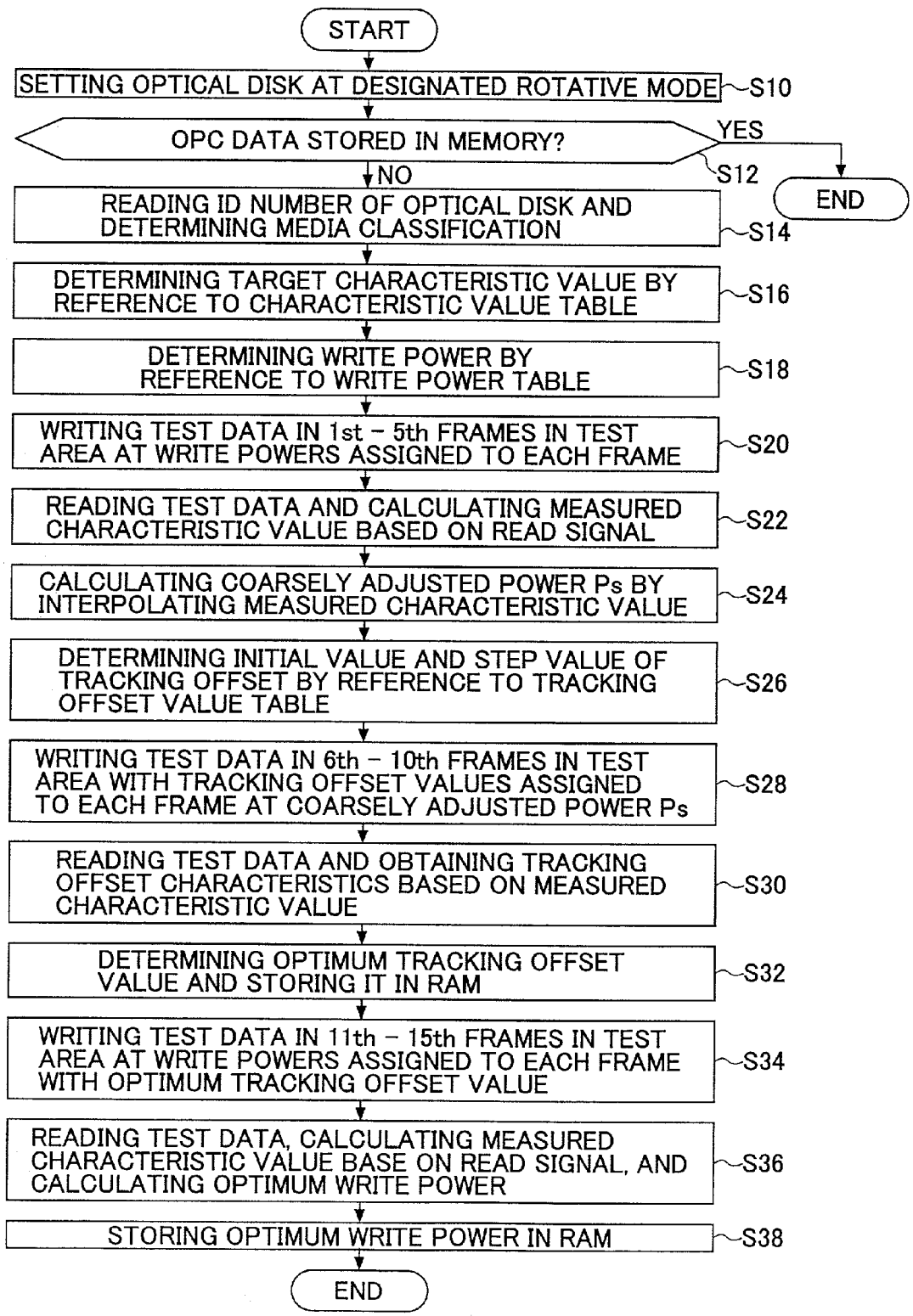
FIG. 4 is a flow diagram of an optimum power control (OPC) operation of the optical disk drive according to the embodiment.

FIG. 4 is a flow diagram of the OPC operation performed in the step S4 as an embodiment of the present invention. The write speed (rotative mode) is set at a designated value inputted by the operation key 50 (Step S10). The microcomputer 24 checks whether previously performed OPC information is stored in the RAM 24a (Decision S12). If the previously performed OPC information is stored in the RAM 24a, the write power is set according to the OPC information (YES branch of S12).

If no OPC information is stored, the ID number of the optical disk 20 is read (S14). A target characteristic value $\beta_0$ is determined based on the ID number of the optical disk and the designated rotative mode (write speed) inputted by the operation key 50 by reference to the characteristic value table as shown in FIG. 5 (S16). The target characteristic value $\beta_0$ is $\beta_4$, for example in the case of a disk type (a disk ID number) D1 and a rotative mode 8 times speed. An initial write power and a step value corresponding to the rotative mode is obtained from the write power table stored in ROM 24b as shown in FIG. 6 (S18). For write speed (rotative mode) of 8 times speed, the initial power is $P_{stt8}$ and the step value is $P_{stp8}$, for example.

Figure 7:
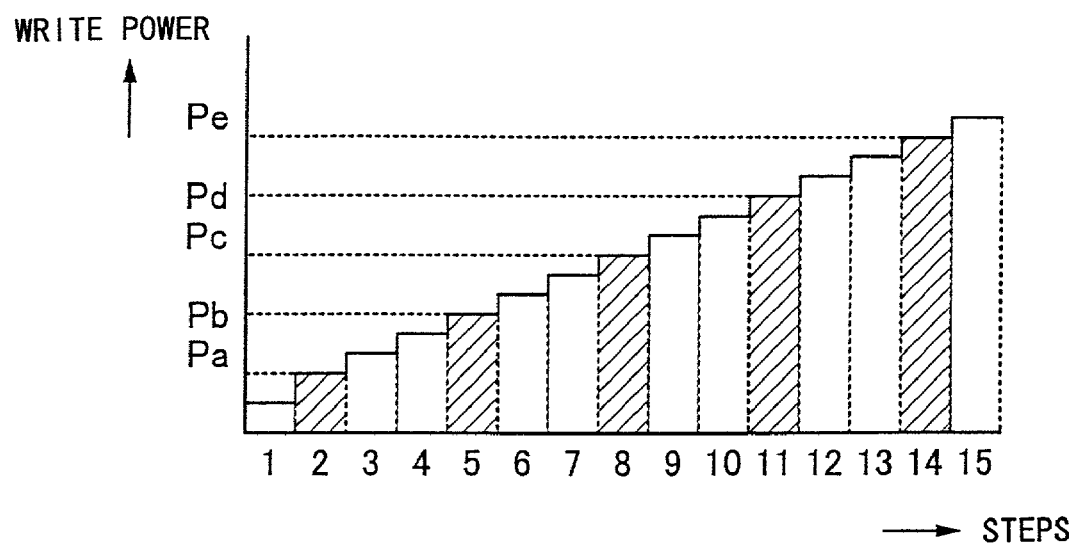
FIG. 7 is a schematic drawing showing write power levels assigned to each power step according to the embodiment.

Next, the total range of laser power from the minimum to the maximum is equally divided into 15 steps as shown in FIG. 7. A test signal is recorded in the first 5 frames, $1^{st}$ frame through $5^{th}$ frame in a test area (including 15 frames in total), which are used for a single conventional OPC operation, using 5 different write powers, $2^{nd}$, $5^{th}$, $8^{th}$, $11^{th}$, and $14^{th}$ of the 15 steps, each frame being recorded at a corresponding write power (S20).

The test signal recorded in the first 5 frames is reproduced, and a measured characteristic value $\beta$ is calculated for each frame, that is, for each write power step. The measured characteristic value $\beta$ is calculated, for example, based on a peak value (P) and a bottom value (B) of the reproduced test signal (S22) as follows:

$$\beta=(P+B)/(P-B).$$

Figure 8:
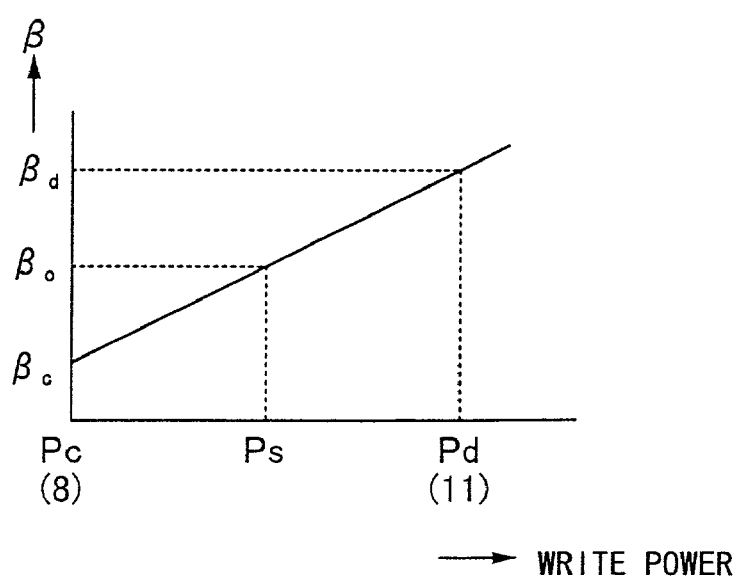
FIG. 8 is a schematic graph showing the process to obtain a coarsely adjusted laser power based on the target characteristic value $β_0$ according to the embodiment.

Since 5 characteristic values $\beta$ are available for 5 steps of the write power, it is possible to calculate a coarsely adjusted laser power Ps that corresponds to the target characteristic value $\beta_0$ by interpolating Pc (corresponding to $\beta_c$) and Pd (corresponding to $\beta_d$) as shown in FIG. 8, the range within which the target characteristic value $\beta_0$ falls (S24).

An initial tracking offset value and a step value corresponding to the write speed (rotative mode) are determined by reference to a tracking offset value table (not shown) stored in the ROM 24b (S26). A test signal is recorded in the second 5 frames, $6^{th}$ through $10^{th}$ frame in the test area, using 5 tracking offset values TO1, TO2, TO3, TO4, and TO5, each frame being recorded by a corresponding tracking offset value (S28). The write power is set at the coarsely adjusted laser power determined in the step S24. The initial tracking offset value and the step are appropriately determined so that the following relationship is maintained: TO1<TO2<TO3 (=0)<TO4<TO5, TO4=−TO2, and TO5=−TO1.

Figure 9:
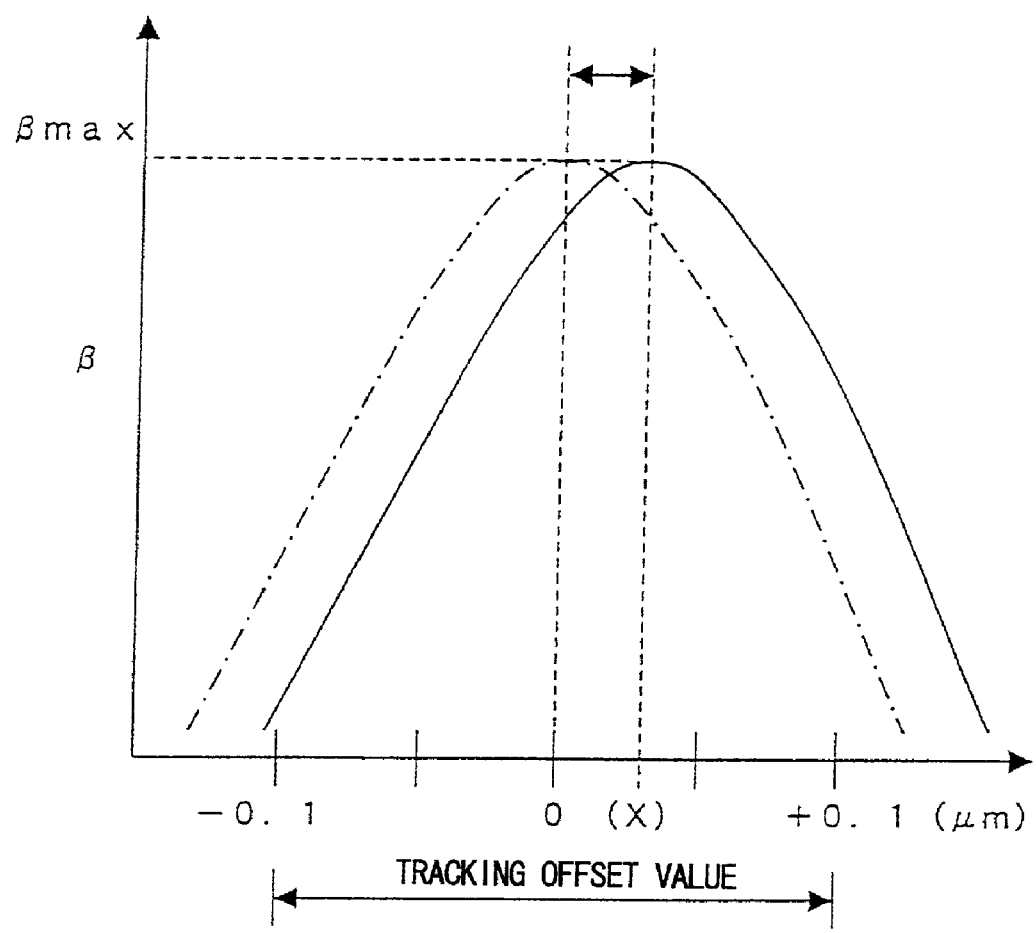
FIG. 9 is a schematic graph showing tracking offset characteristics according to the embodiment.
Figure 10:
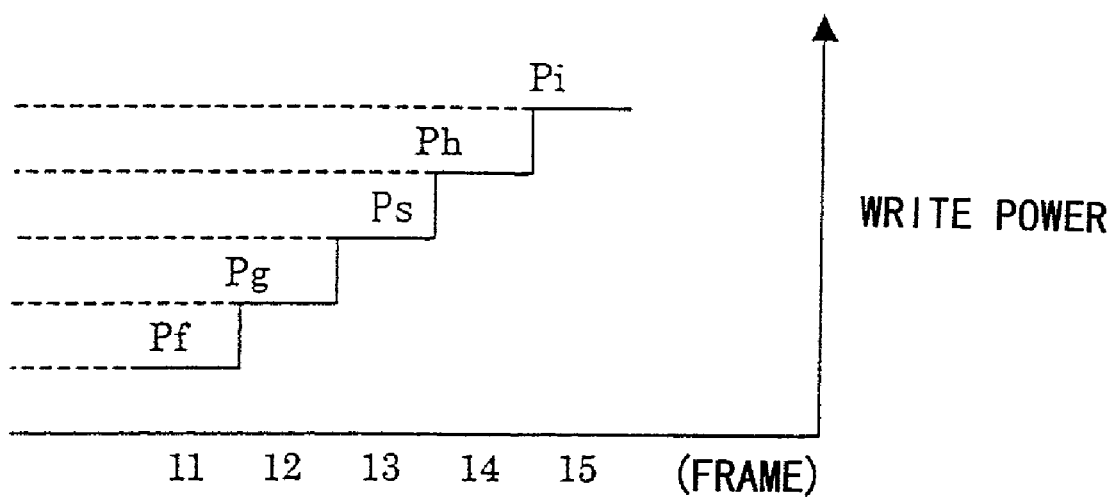
FIG. 10 is a schematic graph showing write powers increasing in 5 steps applied to each frame according to the embodiment.

Next, the test signal recorded in the second 5 frames in the test area is reproduced, and the characteristic value $\beta$ of each frame is calculated. Then, a tracking offset characteristic indicating the relationship between a tracking offset value and a characteristic value $\beta$ as shown in the black line in FIG. 9, is determined by approximating with a quadratic curve (S30). The tracking offset value X corresponding to a maximum $\beta_{max}$ of the quadratic curve is stored in RAM 24a as the optimum tracking offset value (S32).

In FIG. 9, the quadratic curve described by a dashed line shows the case in which the characteristic value $\beta$ becomes maximum at a tracking offset value of 0, that is, the case where the read power axis is identical to the write power axis, and pits are formed on the track center line even without adding tracking offset to the tracking error signal. As described above, in a write operation, the tracking error signal is generated when the laser beam is set at a read power and held by the sample hold circuit 66 while the laser power is set at a write power. Because the tracking error signal generated when the laser beam is set at a read power is used as a tracking error signal when the laser beam is set at a write power, pits are usually formed off the track center line due to the difference in the optical axis angle between the read power laser beam and the write power laser beam. The characteristic value $\beta$ varies as the tracking offset value added to the tracking error signal is increased. In the case wherein the characteristic value $\beta$ is at the maximum value $\beta_{max}$, it is considered that the pits are formed on the center of the track, and the corresponding tracking offset value is determined as the optimum tracking offset value.

Next, a test signal is recorded in the third group consisting of 5 frames, $11^{th}$ through 15th frame in the test area of the optical disk 20 using 5 different write powers increasing in 5 fine steps Pf, Pg, Ps, Ph, and Pi, respectively (S34). The optimum tracking offset value is used to obtain the optimum tracking offset control signal to be provided to the servo circuit 26. The five steps are the coarsely adjusted laser power Ps and two power steps each below and above Ps, that is, Pf, Pg, Ps, Ph, and Pi, each increasing from the previous power step by the same amount.

The test signal recorded in the $3^{rd}$ set of 5 frames is reproduced to obtain the characteristic value $\beta$ of each frame. The optimum write power that corresponds to the target characteristic value $\beta_0$ is obtained by interpolating the measured characteristic values using a line (or a curve) (S36). The optimum write power is stored in RAM 24a as OPC information (S38)

In the step S34, it is possible to divide the total range of the OPC operation from the minimum power to the maximum power into 15 equal steps and use the $2^{nd}$, $5^{th}$, $8^{th}$, $11^{th}$, and $14^{th}$ of the 15 write powers, each being greater than the previous one by the same amount of laser power in the step S20. It is also possible in the steps S20 and S34 to obtain a recommended write power by reference to the ATIP information of the optical disk 20 and use a plurality of write powers centered around the recommended write power. Since the recommended write power is for a rotative mode of the single speed, the write power of "M" times speed is calculated by multiplying the recommended write power by $M^{1/2}$.

As described above, because the optimum write tracking offset value is obtained by measuring the tracking offset characteristics with various tracking offset values, the laser beam traces near the center of the groove during the write operation. Accordingly, the reproduced RF signal is not affected by the wobble and contains less jitter noise.

By the way, the optical disk 20 makes about one turn while the test signal is recorded in 9 frames during the OPC operation. Accordingly, it is possible to modify the steps S28, S30, S34, and S36 as follows.

Figure 11:
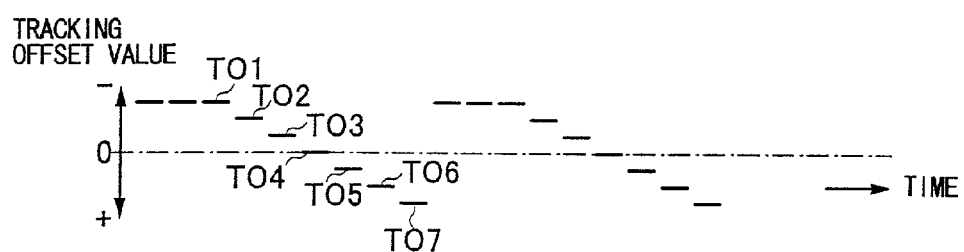
FIG. 11 is a schematic drawing showing a tracking offset value as a function of time according to the embodiment.

As shown in FIG. 11, in the step S28, after two dummy frames, $6^{th}$ and $7^{th}$ frame, a test signal is recorded in 7 frames, $8^{th}$ through $14^{th}$ frame in the first test area reserved for an OPC calibration using 7 different tracking offset values increasing in 7 steps, each frame being recorded by a corresponding tracking offset value ($1^{st}$ test recording). After two dummy frames, the $15^{th}$ frame in the first test area and the $1^{st}$ frame in the second test area, the test signal is further recorded in 7 frames, $2^{nd}$ through $8^{th}$ frame in the second test area using 7 different tracking offset values increasing in 7 steps, each frame being recorded by a corresponding tracking offset value ($2^{nd}$ test recording). FIG. 11 shows the tracking offset value varying frame by frame. The recording is performed using the coarsely adjusted laser power Ps. The tracking offset values of the 7 frames, besides the dummy frames, TO1–TO7 have the following relationship: TO1<TO2<TO3<TO4 (=0)<TO5 (=–TO3)<TO6 (=–TO2)<TO7 (=–TO1), wherein TO1, TO2, and TO3 are negative, and TO5, TO6, and TO7 are positive.

In the step S30, the test signal recorded in the first 9 frames $6^{th}$ through $14^{th}$ including two dummy frames $6^{th}$ and $7^{th}$ is reproduced and the characteristic value β of the $8^{th}$ frame through the $14^{th}$ frame, each frame being recorded by a different tracking offset value are calculated based on the reproduced test signal. Then, the test signal recorded in the second 9 frames $15^{th}$ of the first test area through $8^{th}$ of the second test area, including two dummy frames $15^{th}$ of the first test area and $1^{st}$ of the second test area, is reproduced, and the measured characteristic value β of the $2^{nd}$ frame through the $8^{th}$ frame, each frame being recorded using a corresponding tracking offset value, are calculated based on the reproduced test signal. Then, the two groups of characteristic values β's corresponding to the same tracking offset value obtained in the $1^{st}$ test recording and the $2^{nd}$ test recording are averaged, and the tracking offset property is obtained by approximation using a quadratic curve. In the steps S34 and S36, the test signal is recorded and reproduced in the $9^{th}$ frame through the $13^{th}$ frame of the second test area reserved for another OPC operation.

By performing test recording using two groups at different angular position of the optical disk 20, the dispersion caused by the eccentricities and vertical distortion of the characteristic values β's is reduced.

Figure 12:
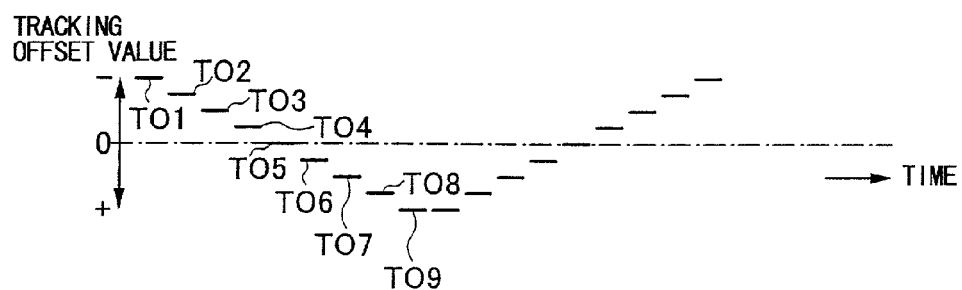
FIG. 12 is another schematic drawing showing a tracking offset value according to the embodiment.
Figure 13:
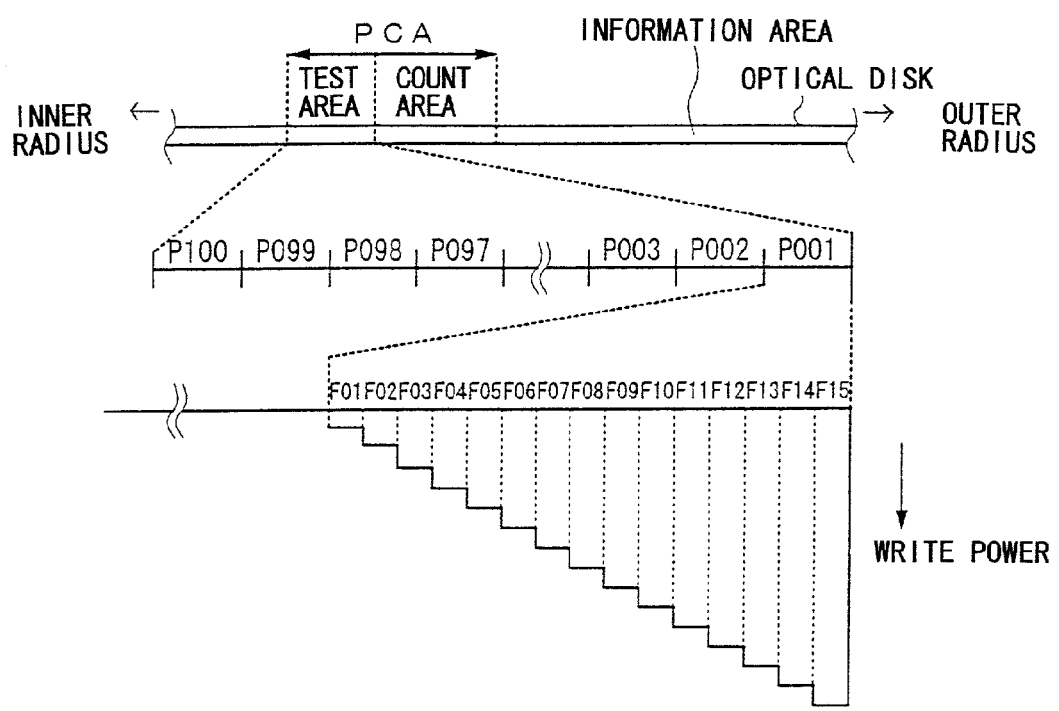
FIG. 13 is a schematic drawing showing the format of an optical disk.
Figure 14:
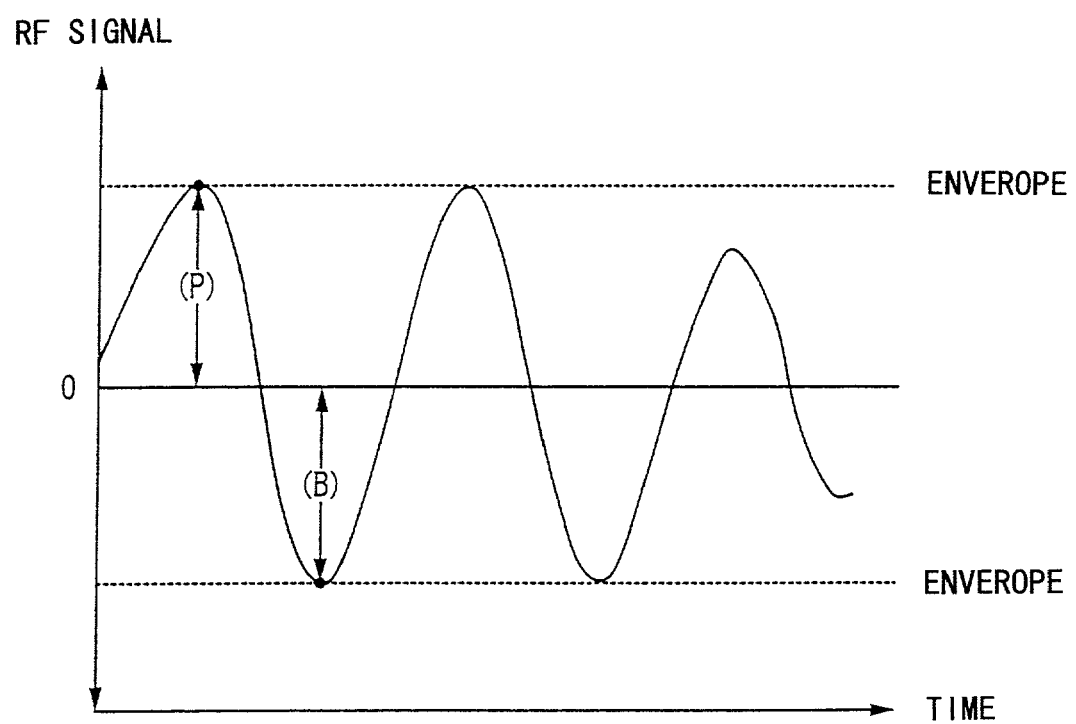
FIG. 14 is a schematic graph showing envelopes, a peak value, and a bottom value of an RF signal reproduced from an optical disk.
Figure 15:
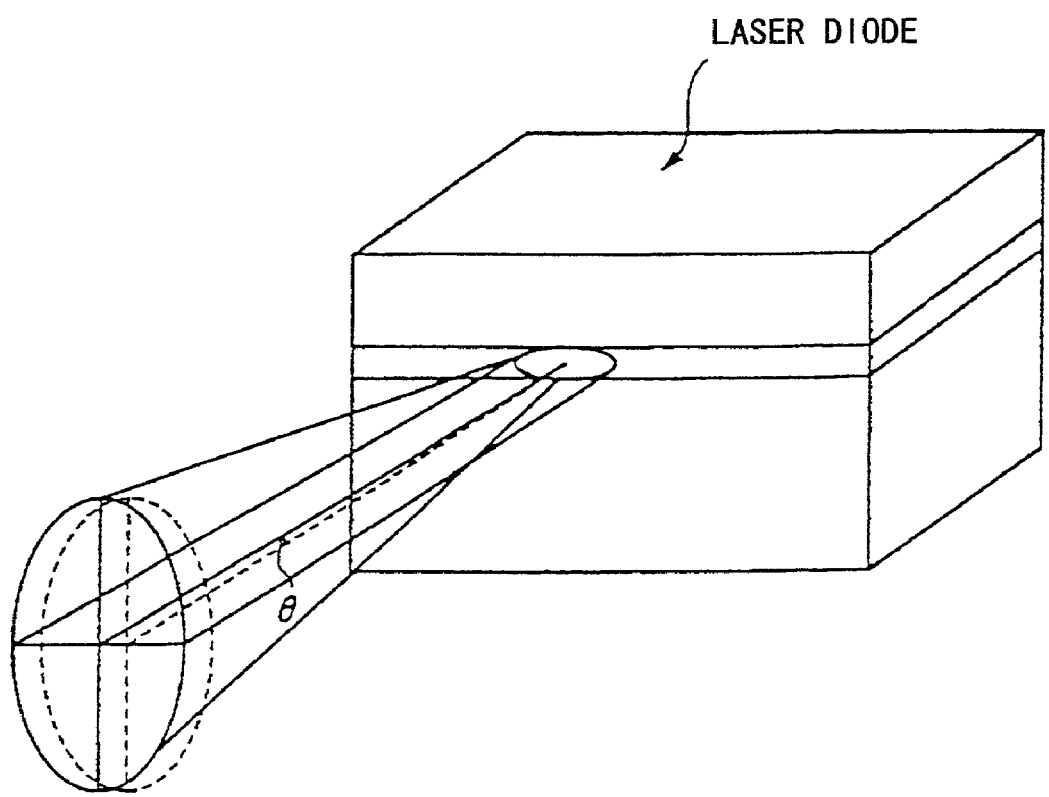
FIG. 15 is a schematic drawing showing the difference in the optical axis of a laser beam emitted at a read power and a write power.
Figure 16:
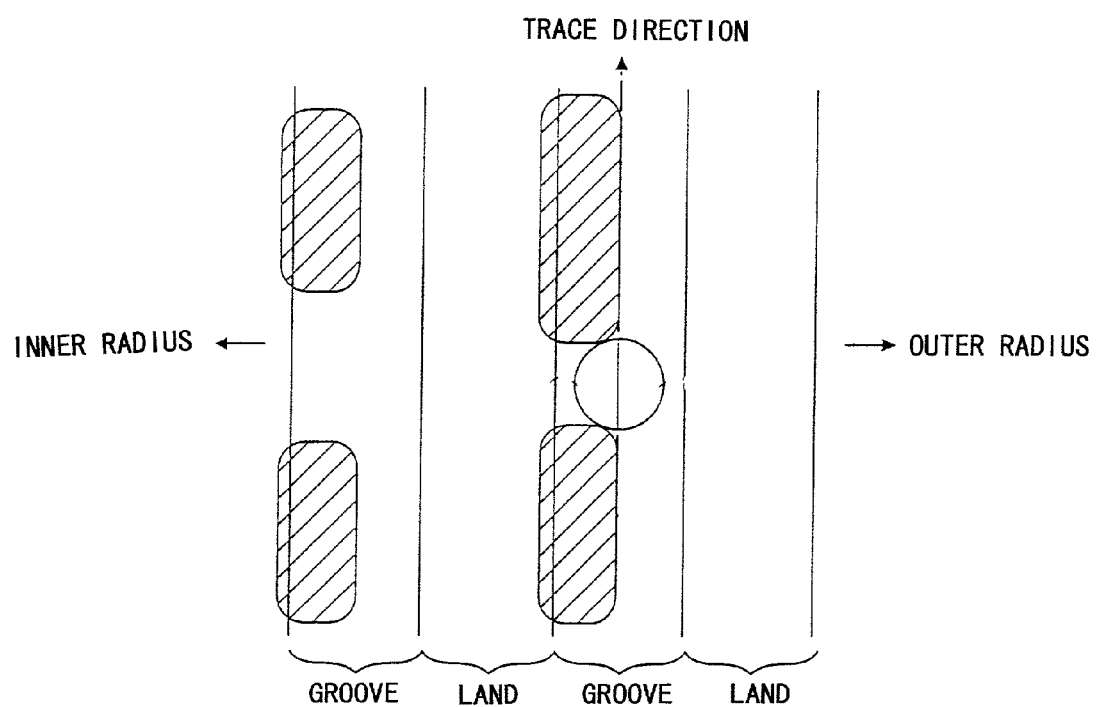
FIG. 16 is a schematic drawing showing pits formed off the center line of a track.
Figure 17:
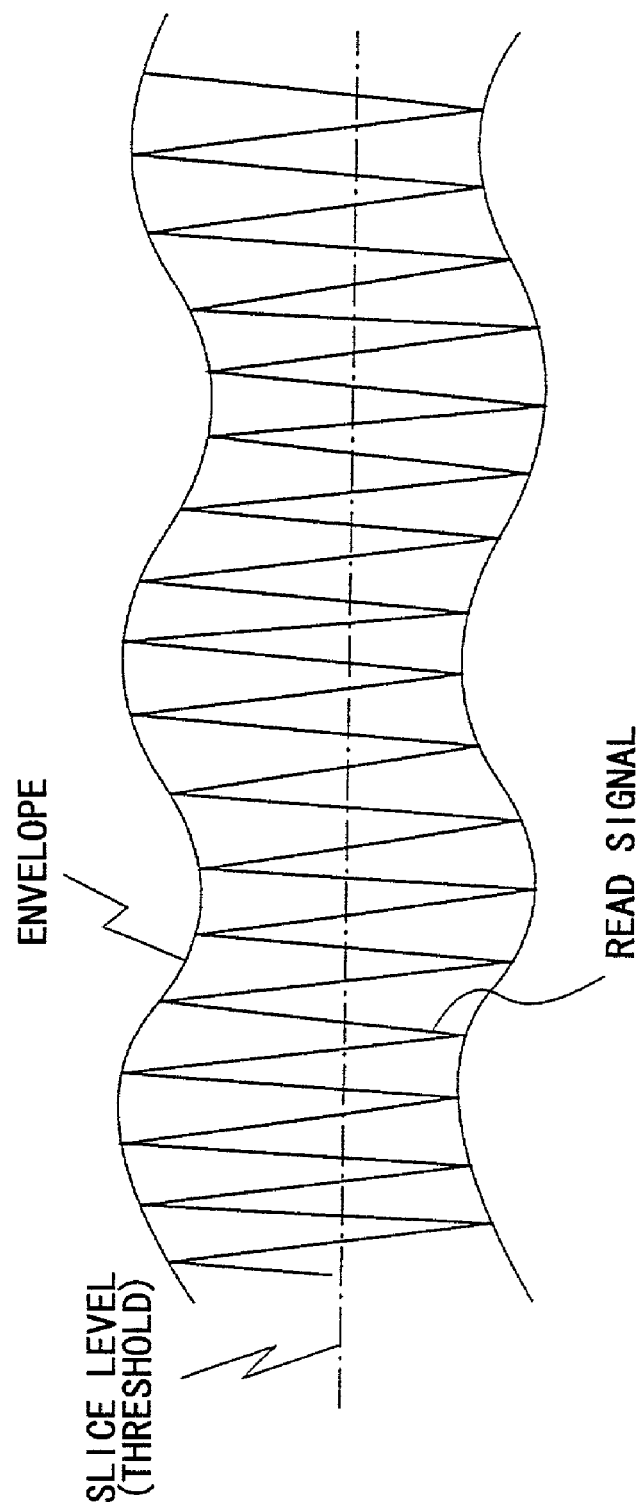
FIG. 17 is a schematic drawing of the waveform of a reproduced RF signal with superimposed wobble signal.

In the step S28 of the above embodiment, the tracking offset values can be changed as shown in FIG. 12. In the first test recording, the tracking offset value is changed in 9 steps frame by frame. That is, the $6^{th}$ frame of the first test area is recorded using a tracking offset value TO1, and the $14^{th}$ frame using a tracking offset value TO9. In the second test recording, the tracking offset value applied to the frames is reduced frame by frame. That is, the $15^{th}$ frame in the first test area is recorded using a tracking offset value TO9, and the $8^{th}$ frame in the second test area using a tracking offset value TO1.

Since the two frames recorded using the same tracking offset value (TO1 for example) are located at different angular positions in the optical disk 20, the dispersion of the characteristic value β caused by the eccentricity or distortion of the optical disk is further reduced.

Further, the present invention is not limited to the embodiments described above, and variations and modifications may be made without departing from the scope of the present invention.

The present application is based on Japanese priority applications No. 2001-050653, filed on Feb. 26, 2001, the entire contents of which are hereby incorporated by reference.

What is claimed is:

1. An optical disk drive that can write data in an optical disk having a plurality of rotative modes, comprising:
    a memory unit disposed in the optical disk drive and configured to store information indicating how a tracking offset value is to be varied corresponding to each of the plurality of rotative modes;
    a microcomputer including a test recording unit and an optimum tracking offset determination unit wherein said test recording unit is configured to read particular information from said memory unit indicating how a tracking offset value is to be varied for a given rotative mode in said plurality of rotative modes wherein the test recording unit writes test data in a first plurality of frames of the optical disk using the tracking offset value being varied in accordance with the particular information being read for said given rotative mode, and wherein said
    optimum tracking offset determination unit is configured to determine the optimum tracking offset value based on characteristic values of signals reproduced from respective frames of the first plurality of frames.

2. The optical disk drive as claimed in claim 1, wherein said test recording unit repeats the writing of test data for a plurality of times with the tracking offset value being varied in accordance with the particular information read from the memory unit; and
    said optimum tracking offset determination unit obtains average characteristic values of respective frames in which the test data is written using the same tracking offset value and determines the optimum tracking offset value of the optical disk drive based on the obtained average characteristic values.

3. The optical disk drive as claimed in claim 2, wherein said test recording unit repeats the writing of test data for a plurality of times such that the frames in which the test data is written using the same tracking offset value are located at different angular positions of the optical disk.

4. In an optical disk drive having a memory unit in which the optical disk drive can write data in an optical disk at a plurality of rotative modes, a method of determining an optimum tracking offset value of the optical disk, the method comprising the steps of:
    reading information from said memory unit indicating how a tracking offset value is to be varied for any given rotative mode of a plurality of rotative modes in the optical disk;
    writing test data in a first plurality of frames of the optical disk using the tracking offset value being varied in accordance with the information read from the memory unit,
    reading the written test data in the first plurality of frames to obtain characteristic values of signals, reproduced from respective frames of the first plurality of frames, and
    determining the optimum tracking offset value of the optical disk drive based on the obtained characteristic values.

5. The method as claimed in claim 4, wherein
    the step of writing test data is repeated for a plurality of times with the tracking offset value being varied in accordance with the reading information; and
    in the step of reading the test data, average characteristic values of respective frames are obtained in which the test data is written based on using the same obtained tracking offset value; and
    in the step of determining the optimum tracking offset value, the optimum tracking offset value of the optical disk drive is obtained based on the obtained average characteristic values.

6. The method as claimed in claim 5, wherein the frames in which the test data is written using the same tracking offset value are located at different angular positions of the optical disk.

* * * * *